March 15, 1949. S. W. TRAYLOR, JR 2,464,732
JAW CRUSHER
Filed May 1, 1945 10 Sheets-Sheet 1

FIG. 1.

INVENTOR.
Samuel W. Traylor, Jr.
BY
attys

March 15, 1949. S. W. TRAYLOR, JR 2,464,732
JAW CRUSHER
Filed May 1, 1945 10 Sheets-Sheet 2

INVENTOR.
Samuel W. Traylor, Jr.
BY
Cushman Darby & Cushman
attys

March 15, 1949. S. W. TRAYLOR, JR 2,464,732
JAW CRUSHER
Filed May 1, 1945 10 Sheets-Sheet 3

INVENTOR.
Samuel W. Traylor.
BY
Cushman Darby Cushman
Attys

March 15, 1949.  S. W. TRAYLOR, JR  2,464,732
JAW CRUSHER
Filed May 1, 1945  10 Sheets-Sheet 4

INVENTOR.
Samuel W. Traylor, Jr
BY
Cushman Darby Cushman
Attys.

March 15, 1949. S. W. TRAYLOR, JR 2,464,732
JAW CRUSHER
Filed May 1, 1945 10 Sheets-Sheet 5

INVENTOR.
Samuel W. Traylor, Jr.
BY
Cushman Darby Cushman
attys

March 15, 1949.  S. W. TRAYLOR, JR  2,464,732
JAW CRUSHER

Filed May 1, 1945  10 Sheets-Sheet 7

Inventor
Samuel W. Traylor, Jr.
By Cushman Darby & Cushman
Attorneys

March 15, 1949. S. W. TRAYLOR, JR 2,464,732
JAW CRUSHER
Filed May 1, 1945 10 Sheets-Sheet 9

Inventor
Samuel W. Traylor, Jr.
By Cushman Darby, Cushman
Attorneys

Patented Mar. 15, 1949

2,464,732

UNITED STATES PATENT OFFICE 2,464,732

JAW CRUSHER

Samuel W. Traylor, Jr., Allentown, Pa.

Application May 1, 1945, Serial No. 591,342

28 Claims. (Cl. 241—198)

This invention relates to crushers of the type comprising cooperating jaws of which at least one is movable relative to the other on a horizontal axis extending transversely to the direction of jaw movement, the jaws defining a downwardly tapering crushing space between them. This type is exemplified by crushers employing a gyratory roll, herein considered a jaw, and by crushers employing a swing jaw, i. e., a jaw pivoted on a fixed axis about which it is caused to oscillate.

A main object of the invention is to increase the capacity of the stated type of crusher by providing for an efficient lateral as well as end discharge from the crushing space. How these and other objects are attainable will be described with reference to illustrative embodiments of the invention shown in the accompanying drawings in which:

Referring to the drawings and first to Figures 1 to 17, reference numeral 60 designates a base frame which at its sides has opposite bearing blocks 61 and 62 with horizontally aligned semicylindrical upper portions which receive bearings 63 and 64, the latter being retained by bearing caps 65 and 66 bolted to the blocks. Longitudinal movement of the bearings 63 and 64 is prevented by ribs as at 67, Figure 3, in the block and cap engaged in a peripheral groove of the bearing, and rotation of the bearings is prevented by keys as at 68, Figure 3.

Journalled in the bearings through the intermediary of bushings 69 and 70 is a drive shaft 71 which has an eccentric central portion 72 on which is rotatable a roll core 73 through the intermediary of a bushing 74. Wear rings 75 and 76 are interposed between the ends of core 73 and bearings 63 and 64 respectively.

Core 73 is steeply conical on its axis and has wedged thereon a tire or face 77, the latter being retained in place by bolts 78 disposed in recesses parallel to the roll axis and having angular portions 79 engaging one side of the face. Face 77 is provided with parallel identical peripheral grooves 80 and 81, each groove, as here shown, being outwardly flared and substantially triangularly symmetrical with the apex rounded. The grooves are of constant section throughout.

Figure 1:
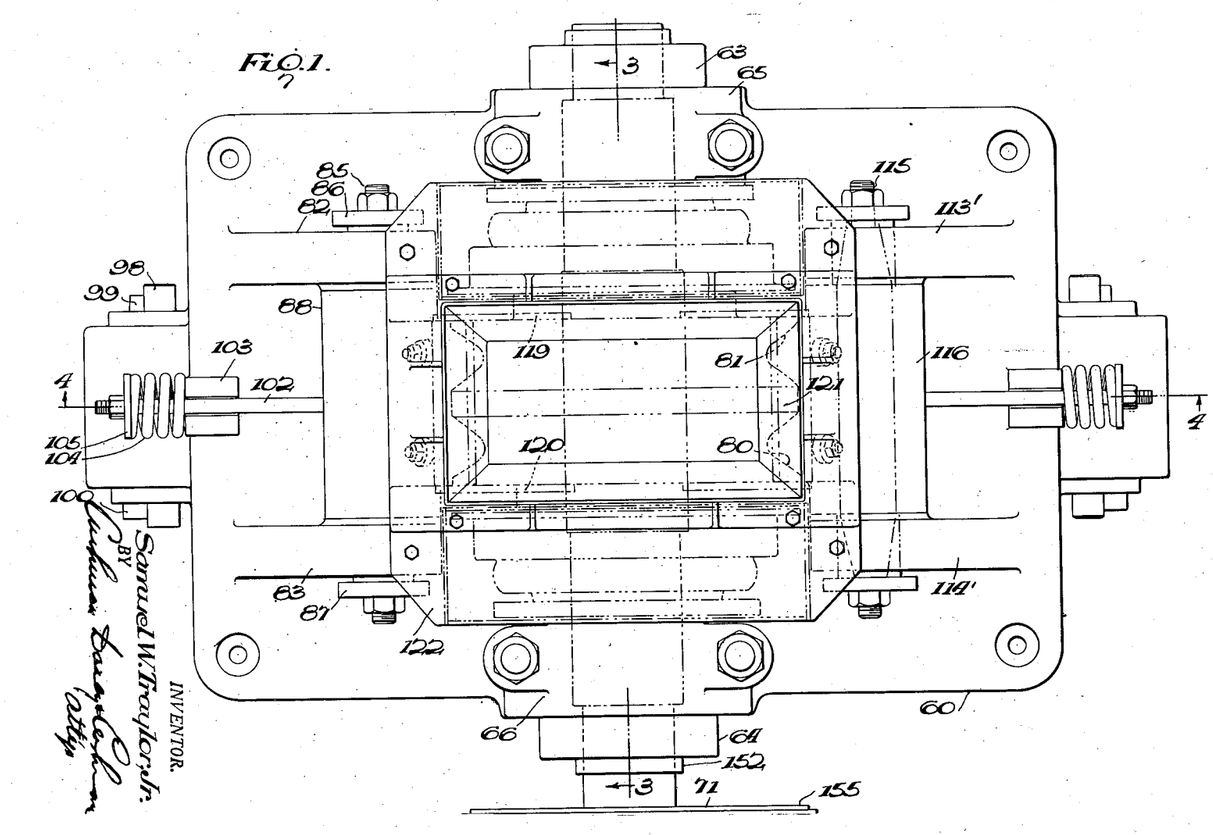
Figure 1 is a plan view of a gyratory roll jaw crusher in accordance with the invention.
Figure 2:
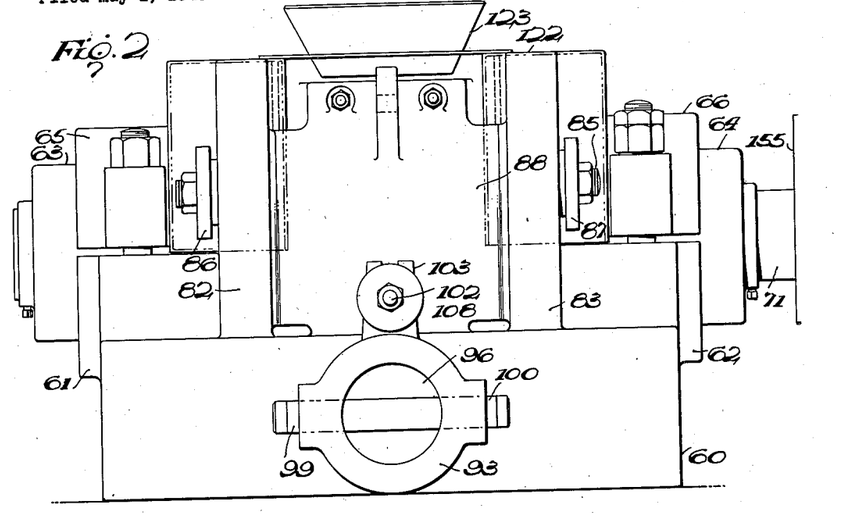
Figure 2 is an end view of the crusher of Figure 1 as seen from the left of the latter.

To the left of the roll a pair of pedestals 82 and 83, Figure 1, rises from the base 60 and are pierced at their upper ends parallel to the axis of the shaft 70 for the support of a shaft 85 which is secured in place by clamping sleeves 86 and 87 engaged by nuts threaded on the reduced ends of the shaft. Pivoted on shaft 85 is a fixed or bottom jaw 88 which includes a downwardly extending web 89 from which parallel spaced-apart jaw portions 90 and 91 project under the roll, terminating short of the vertical plane of the drive shaft axis.

Reference numeral 92 designates a plunger slidable in a cylinder 93 rigid on the base with its axis substantially perpendicular to the vertical plane of drive shaft axis. A key 94 carried by plunger 92 engages in a way in the cylinder wall to prevent rotation of the plunger. Plunger 92 has a reduced end 95 engaging a wear pad on the back of jaw web 89. Disposed between the other end of the plunger 92 and a backing plate 96 are a number of dished plate springs 97. Member 96 is in turn backed by a slightly tapered wedge 98 which is driven between it and a key 99 which extends through openings in opposite side walls of the cylinder 93. At the large end of the wedge, key 99 has a laterally projecting head 100, constituting a stop so that the wedge can be driven into position without carrying the key. In case of necessity, the wedge can be quickly driven out to release plunger 92 and jaw 88. Pivoted between ears as at 101 on the back of jaw 88 is a rod 102 which extends through a split lug 103. A compression spring 104 surrounds rod 102 beyond lug 103, one end of the spring engaging the lug and the other being engaged by an adjustable stop 105 on the rod extremity. Spring 104 holds jaw 88 solidly against plunger 92.

Jaw 88 has a curved front surface 106 following the curve of the roll and, in the illustrated relation of parts, surface 106 is arcuate substantially on the drive shaft center. Beyond web 89, surface 106 divides into surfaces 106a and 106b of jaw portions 90 and 91, Figure 3. The latter surfaces are provided centrally with longitudinally extending grooves 107 and 108 which are continued upwardly into the solid portion of face 106 above the split between the jaw portions.

Figures 4, 5, 6:
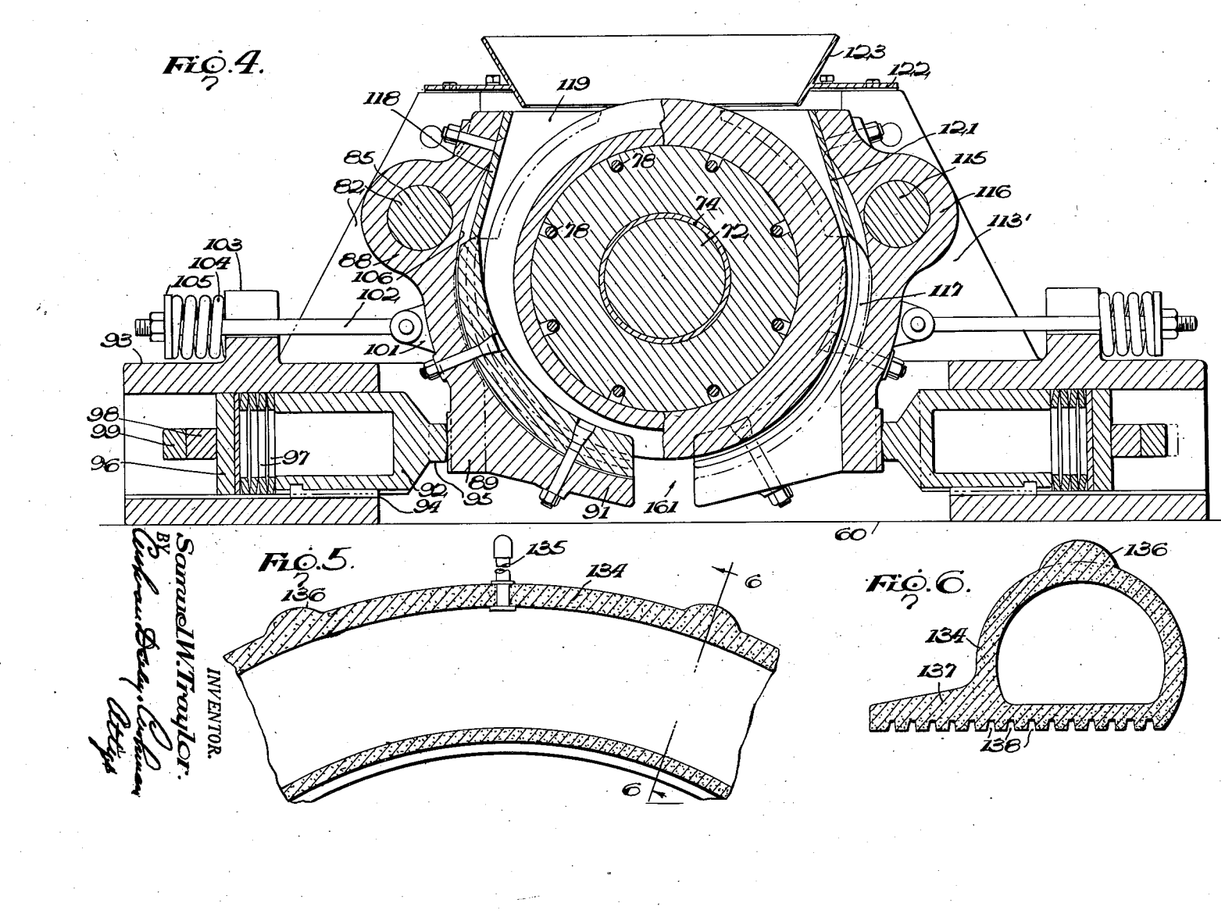
Figure 4 is a section substantially on line 4—4 of Figure 1.
Figure 5 is a section of a portion of an annular pneumatic sealing member which appears in Figures 1 and 2, the section being taken along an arc of the member.
Figure 6 is a section on line 6—6 of Figure 5.
Figure 7:
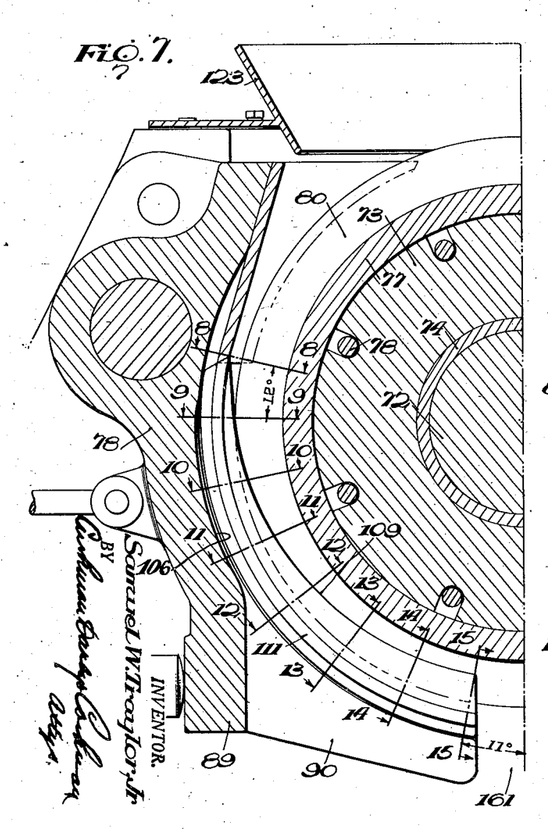
Figure 7 is a sectional elevation on a larger scale, with parts removed, of the left hand portion of the crusher of Figure 1, the roll being shown in section.
Figures 8, 9:
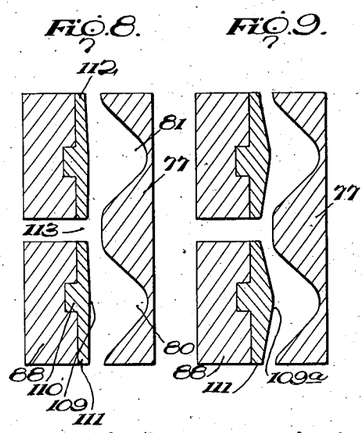
Figures 8 to 15 are sections on the indicated lines of Figure 7.
Figure 10:
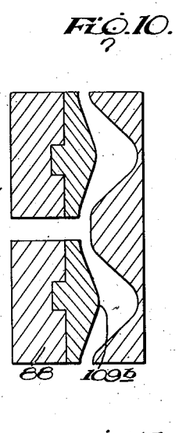
Figure 11:
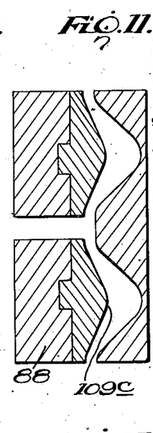
Figure 12:
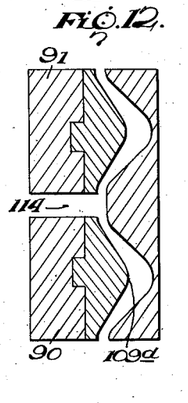
Figure 13:
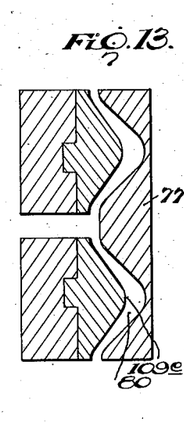
Figure 14:
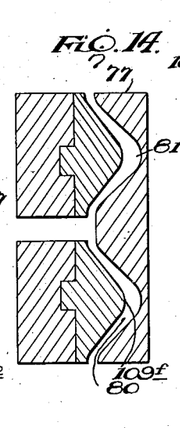
Figure 15:
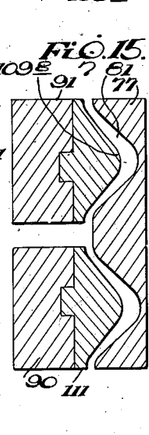

Referring to Figures 4, 7, and 8, reference numeral 109 designates a jaw face having a rear surface arcuate as the surface 106 and lying thereagainst, the face having a central longitudinally extending rib 110 (Figure 8) engaged in the groove 107 and being retained by bolts in the manner shown in Figure 4. As here shown, and as indicated in Figure 7, the jaw face curves downwardly along and under the roll from above the horizontal to a point in advance of the vertical. Substantially down to the horizontal, and as indicated in Figure 8, the front surface of the jaw is transversely flat. In Figure 9, a slight transverse convexity 109a appears and this increases in depth, while remaining of constant width, up to 109g at the jaw end, as shown in Figures 10 to 15. The face has a base rim 111 which continues at a constant thickness and width throughout the length of the face. The transverse convexity is symmetrical and as here shown its section is that of a blunted triangle, flattening or rounding off somewhat to the rim thickness. As also shown in Figures 8 to 15, the roller groove 80 is flattened or rounded off somewhat at its margins. From Figures 9 to 15, it will be seen that the convexity, or rib, of the jaw face increasingly enters groove 80 so that the cross-sectional area of the space between the jaws progressively decreases. A crushing space is provided which tapers longitudinally throughout and which tapers laterally from the crest of the convexity or rib at each transverse section. The jaws are shown in open relation.

As an example of a suitable proportioning of parts in a roll crusher whose roll has a diameter of 36", the following may be given:

The eccentricity of the drive shaft is $\frac{1}{4}$", giving a $\frac{1}{2}$" throw. The roll grooves are 3" deep with their side walls at 90° to each other and apex rounded on a $1\frac{1}{2}$" radius. The fixed jaw face extends from 12° above horizontal down to 11° in advance of vertical. The rim portion 111 of the face has a constant width of 8" and thickness of $\frac{3}{4}$". The convexity or rib begins substantially at the horizontal, increasing to a depth of $2\frac{1}{2}$" at the lower end of the face at which point the sides are at an angle of 104° to each other with the apex rounded on a somewhat smaller radius than the roll groove. With the rim 111 disposed on the drive shaft axis as a center, there is a minimum spacing, in the closed position of the jaws, of $\frac{1}{2}$" between the roll periphery and the rim throughout the length of the latter as the roll gyrates. The crest of the convexity or rib is arcuate on a radius of $18\frac{1}{2}$" from a point $2\frac{1}{8}$" above and $\frac{3}{8}$" to the right of the shaft axis.

With the fixed jaw face formed and disposed as just described, sections thereof in vertical planes parallel to the drive shaft axis show a substantially constant angularity.

Jaw 88 carries another face 112 which is identical to the face 109 and extends along jaw portion 91 in cooperative relation with the roll groove 81. As indicated in Figures 8 to 11, a space 113 is provided throughout between the faces 109 and 112. In Figures 12 to 15, reference numeral 114 designates the space between the jaw portions 90 and 91. Each face is thus open at its sides throughout its length and is spaced at its lower end from the roller face. The escape of crushed material is thus permitted at the sides and at the ends of the crushing spaces.

Pedestals 113' and 114' on the opposite side of the roll from the pedestals 83 and 84 support a shaft 115 exactly like shaft 85 and supporting a fixed jaw 116, Fig. 4, the same as jaw 88 and similarly including crushing faces of which one is shown at 117. Jaw 116 is spring-positioned in the same manner as jaw 88 and its faces cooperate with the roll grooves opposite faces 109 and 112.

A wearing plate 118 is fixed to the front face of jaw 88 and forms a joint with top marginal portions of faces 109 and 112. The plate has lateral wings 119 and 120, Figures 1 and 4, which extend along the top sides of the roll face with slight clearance. A similar wearing plate 121 is similarly secured to jaw 116.

In Figure 1, reference numeral 122 designates a substantially rectangular plate secured to the tops of pedestals 82, 83 and 113 and 114, the plate being provided with a rectangular opening above the roll and the opening being rimmed by flared plates to provide a hopper 123. Plates 124 and 125, Figure 3, depend from the lateral edges of plate 122 and have bottom semicircular recesses which engage over caps 65 and 66 beyond end flanges of the caps. Also depending from plate 122 are plates 126 and 127 which have semicircular recesses receiving hub portions of core 73 with clearances allowing for the gyratory movement of the latter.

Figure 3:
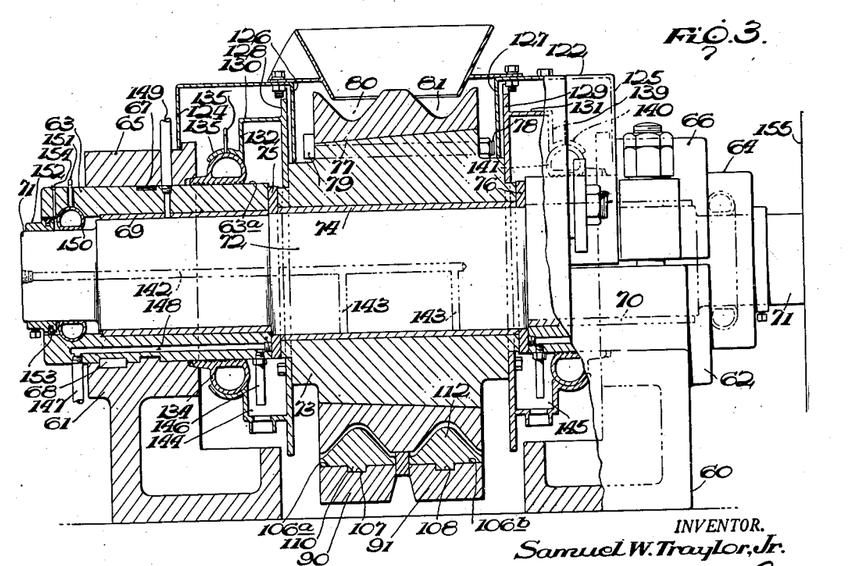
Figure 3 is a section substantially on line 3—3 of Figure 1 with the lower portion substantially on line 15—15 of Figure 7.

Screwed to the end faces of core 73 are imperforate circular plates 128 and 129 from which imperforate cylindrical flanges 130 and 131 project outwardly coaxially with the roll. An imperforate flange 132 projects inwardly from flange 130 and at its inner end joins an annular transversely arched flange 133 which is coaxial with the roll. Flange 133 serves as a tire rim and engages a pneumatic tire 134 which has a cylindrical inner face slidingly engaging a cylindrical portion 63a of bearing 63. As shown in Figures 3 and 5, the rubber tire 134 has an inflating stem which in Figure 3 is shown as projecting through an opening in the rim. On its outer periphery, the tire is provided with a number of spherical protuberances which mate with recesses in the underside of the rim to lock the latter and the tire against relative rotation. Referring to Figures 3 and 6, the cylindrical inner periphery of the tire is shown as being extended outwardly in a flange 137 which, in Figure 3, is in an annular recess formed in the block 61 and cap 65. The inner periphery is provided with a multiplicity of circumferential grooves 138 which form a multiplicity of pockets between the tire and bearing 63 spaced axially of the latter so that an effective seal is provided between the tire and the bearing.

The flange 131 through a flange 139 and a rim 140 carries a sealing tire 141 exactly like the tire 134 and cooperating with bearing 64. It will be evident that the tires and their supporting flanges provide a complete seal between the bearings 63 and 64 and the ends of the roll, the resiliency of the sealing members constituted by the tires permitting the free gyratory movement of the roll relative to the bearings.

In Figure 3, reference numeral 142 designates an axial bore in shaft 71 terminating in the eccentric portion 72, radial bores 143 and connecting bore 142 with the bushing 74. The outer end of the bore 142 is tapped for engagement by a swivel coupling which is in connection with an oil pump, not shown. Oil supplied to the bushing 74 escapes at the ends of the eccentric portion 72 and is received in the pockets 144 and 145 defined by the sealing means above described, these pockets being drainable through the illustrated bottom openings which are ordinarily plugged. Reference numeral 146 designates a tube tapped in to the bottom of bearings 63 and projecting into the pocket 144. A tube 147 leads from an oil withdrawal pump and is tapped into the bottom of bearing 63 in connection with a duct 148 formed in the latter and leading to tube 146. The excess oil supplied to the roll is thus removable in good condition since the sealing provisions prevent the entrance of dust into the pocket 144. Similar oil removal provisions are in connection with the pocket 145.

Reference numeral 149, Figure 3, designates an oil supply pipe for bushing 69. At its outer end bearing 63 is internally annularly recessed to receive a pneumatic sealing tube 150, this tube being like the tube 134 except that the lateral flange is omitted. An inflating stem 151 for the tube 150 projects through an opening in the bearing. Member 150 forms a seal between the bearing and the outer end of shaft 71 and, consequently, excess oil has to flow into the pocket 144. Outwardly of member 150 a ring 152 is tightly engaged with the shaft end, the ring having a peripheral groove which receives a ring 153 sealing with the inner wall of the bearing 63. A grease injecting opening 154 is provided in the bearing between members 150 and 153. Similar provisions are provided for the other end of shaft 71 and to this end is secured a drive pulley 155 which partially appears in Figures 1 to 3.

Figure 16:
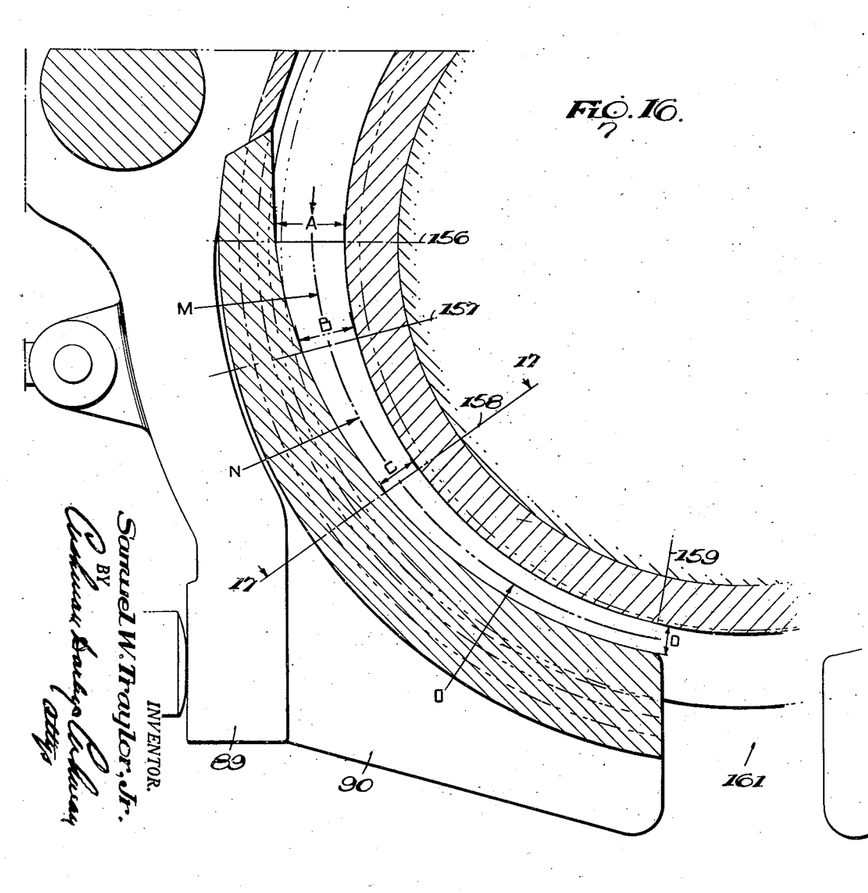
Figure 16 is a fragmental sectional elevational view on an enlarged scale of the left hand side of the crusher on the same section line as in Figure 4, particularly illustrating the longitudinal zone divisions of the crushing space.
Figure 17:
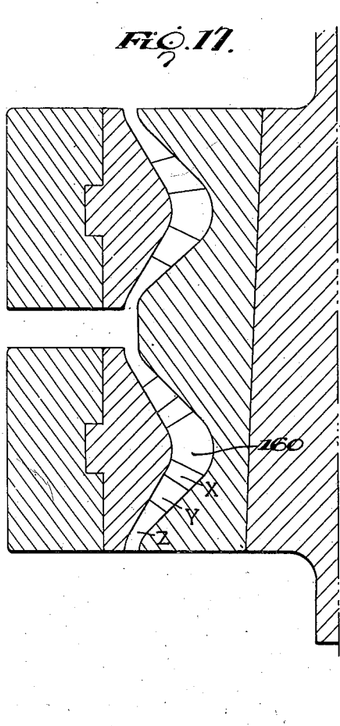
Figure 17 is a section substantially on line 17—17 of Figure 16 illustrating the transverse zone divisions of the crushing space.
Figure 18:
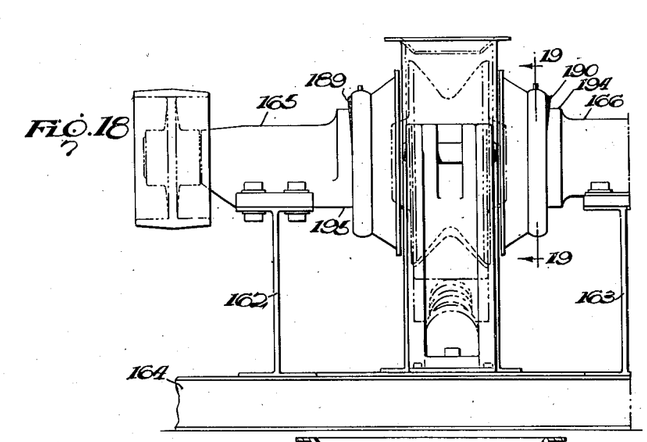
Figure 18 is an end elevation of another form of gyratory roll crusher in accordance with the invention.
Figure 19:
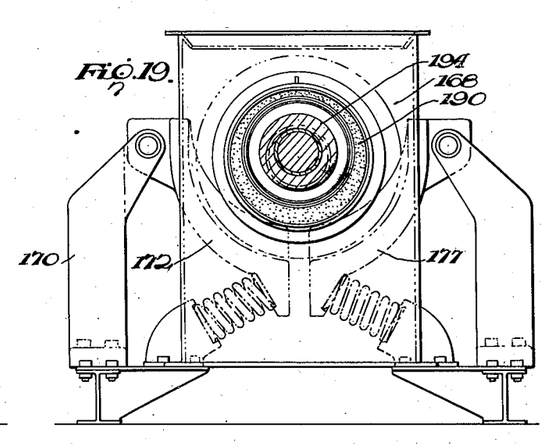
Figure 19 is a section substantially on line 19—19 of Figure 18.
Figure 20:
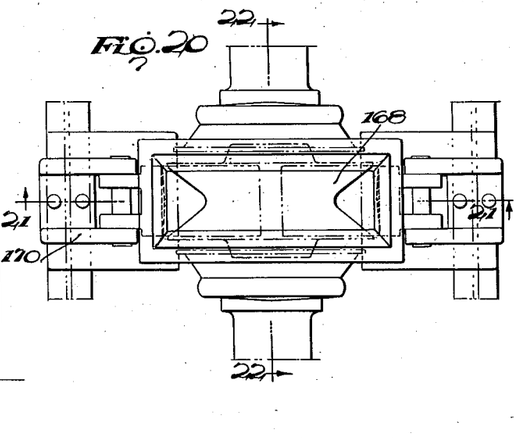
Figure 20 is a plan view of the crusher of Figures 18 and 19.
Figure 21:
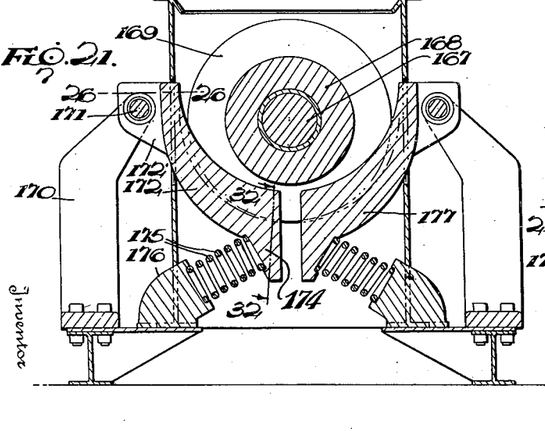
Figure 21 is a section substantially on line 21—21 of Figure 20.

With shaft 71 being driven and crushable material, such as stone, being supplied to hopper 123, the crushing action proceeds in the manner illustrated in Figures 16 and 17.

Referring to Figure 16, reference letter M designates a crushing zone extending between lines 156 and 157. The jaws are considered to be in their maximum apart relation on each line and the dimension A at the upper end of zone M and the dimension B at the lower end thereof are each, consequently, at a maximum not actually simultaneously reached. These dimensions are distances between the bottom of the roll groove and the nearest point of the fixed jaw face. They remain constant in the normal operation of the crusher since the supporting springs 97 will only yield when uncrushable fragments are encountered.

The relation of A to B is such that in the closed position of the jaws, A becomes substantially equal to B. This means that a fragment caught at the top of zone M in the open relation of the jaws and reduced to the dimension B upon the closing of the jaws, can then drop to the bottom of the zone when maximum open position is reached on line 157. Fragments reduced beyond the dimension B can move laterally due to the effect of the convexity of the fixed jaw face, and any pieces to size can, of course, escape laterally at once.

A second crushing zone N extends between line 157 and a line 158 and at its lower end has a dimension C to which B becomes substantially equal in the closed relation of the jaws. Since the cross-sectional area of zone N is decreasing from line 157 to 158 the length of the zone is ordinarily greater than the length of zone M so that zone N can receive from zone M all of the material which has not been laterally discharged from the latter.

A third zone O extends from line 158 to a line 159 which is at the lower end of the effective length of the jaw and has the dimension D to which the dimension C becomes equal when the jaws close. Zone O is ordinarily longer than zone N and it has a volumetric capacity sufficient to contain all the material reaching it from zone N.

Figure 17 shows similar zone divisions transversly of the jaws. At the point where the section is taken, that is, between zones N and O, a void 160 may exist at the crest of the fixed jaw and at one side of this void laterally progressive zones X, Y and Z are indicated, these zones having related volumetric capacities like those of zones M, N and O, i. e., each can contain all the material reaching it from a preceding zone.

The crushing zone may be thought of as having two general paths of flow, namely, a primary path extending substantially longitudinally of the crushing surface and secondary paths directed laterally into which the primary path merges. Large pieces sufficiently crushed at the top of the crushing space, and pieces already small enough, immediately take the secondary path where they are crushed and discharged laterally. The decreasing longitudinal steepness of the crushing space as it curves toward the horizontal is compensated for by the increasing sharpness of the convexity of the bottom jaw face and, as is stated above, sections taken in vertical planes parallel to the drive shaft axis of a fixed jaw face formed and disposed as described, will be substantially constant in angularity. The fixed jaw face exerts an increasing lateral discharge effect throughout the length of its convexity. The face, of course, has no positive lateral discharge effect in its flat portion above line 156, Figure 16.

With the described jaw arrangement rapid reduction of the material is effected for the main reason that material to size can escape at once, and is forced to escape, laterally throughout the length of the convexity. Material reaching the lower end of the fixed jaw face can freely fall in the space 161 which exists between the lower ends of opposed jaws. This and the capacity of each zone to receive from a preceding zone all of the material reaching it from the latter preclude any possibility of choking in normal operation. The same crushing action occurs between the roll and the other three fixed jaws and the capacity of the crusher can, of course, be increased as desired by increasing the number of roll grooves and cooperating jaws.

A somewhat simplified form of roll crusher in accordance with the invention is illustrated in Figures 18 to 32. In these figures, reference numerals 162 and 163 designate pedestals fixed on a base frame 164, the pedestals supporting bearings 165 and 166 for a drive shaft 167 having an eccentric portion between the bearings on which a roll 168 is rotatable. In this case, the roll has an integral face provided with a peripheral groove 169.

A pedestal 170 is bolted to the base and at its upper end supports a shaft 171 parallel to the drive shaft axis on which is pivoted a jaw 172 which curves downwardly along and under the roll. The jaw includes an arcuate rim portion 172′ and a convexity or rib 173 which increases downwardly in depth and steepness to its lower extremity, the convexity having a crest which is arcuate longitudinally. The jaw is provided at its lower end with a downward extension 174 constituted as a seat for one end of a compression spring 175 whose other end seats against a block 176 bolted to the frame, the spring holding the jaw in substantially constant position in normal operation. In the relation of parts particularly shown in Figure 21, the jaw rim 172′ is disposed substantially on the drive shaft axis as a center. The rib starts to enter the roll groove 169 at about the horizontal and increasingly enters the groove downwardly nearly to the vertical. Pedestal 170 and block 176 may be bolted to the frame through slots in the latter which extend transversely of the roll axis and in this manner various adjustments may be obtained.

Reference numeral 177 designates a jaw the same as jaw 172 and mounted in the same manner and in the same relation to the opposite side of the roll.

Figures 22, 23, 24, 25, 26, 27, 28:
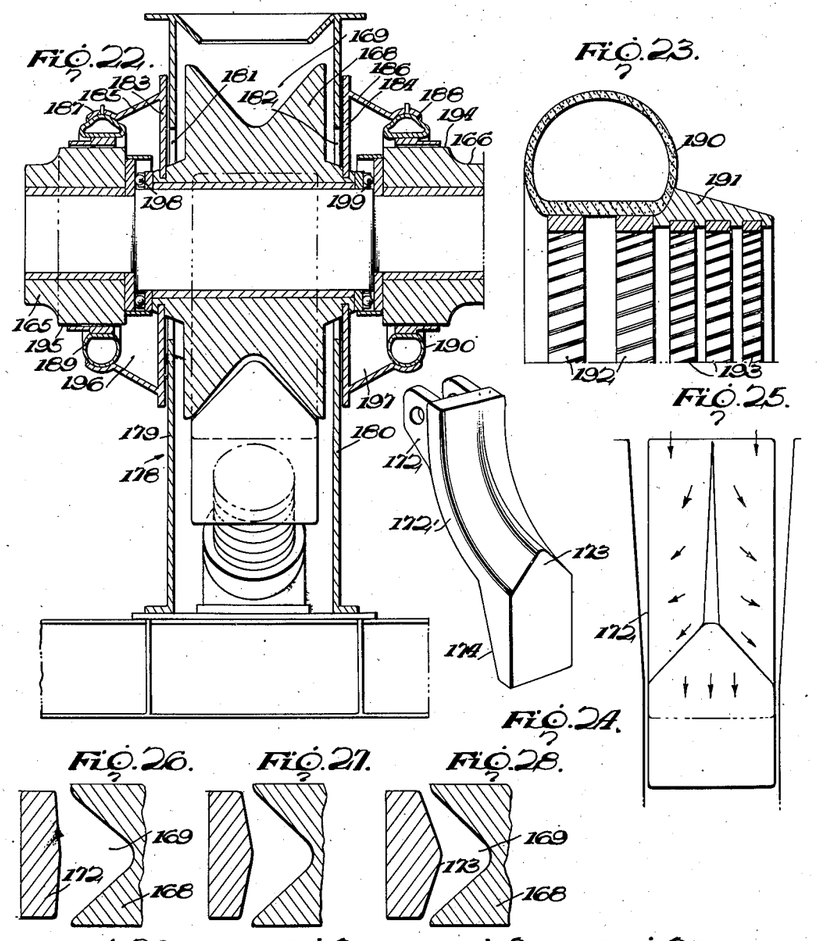
Figure 22 is a section, on a larger scale on line 22—22 of Figure 20.
Figure 23 is a transverse section on an enlarged scale of an annular pneumatic sealing element which appears in Figures 18 to 20 and 22.
Figure 24 is an isometric view of a fixed jaw as used in the embodiment of Figure 18.
Figure 25 is a face view, on a larger scale of the jaw of Figure 24.
Figures 26 to 32 are sections taken on lines 26—26 and 32—32 of Figure 21 and on lines equally spaced between the said lines.
Figure 29:
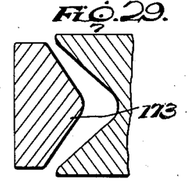
Figure 30:
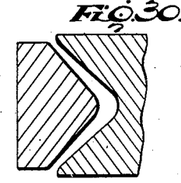
Figures 31, 32:
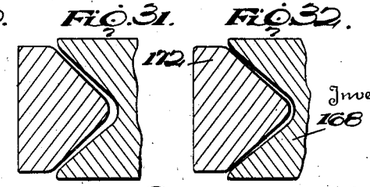

Reference numeral 178 designates a housing of rectangular horizontal section having side walls 179 and 180 adjacent the side surfaces of roll 168 and provided with circular openings 181 and 182 which receive hub portions of the roll with sufficient clearance to permit the free gyratory movement of the latter. Fixed to the hub portions of the roll outwardly of the side walls 179 and 180 are imperforate annular plates 183 and 184 which through imperforate annular flanges 185 and 186 carry rims 187 and 188 which receive pneumatic sealing tubes 189 and 190. Referring to Figure 23, the tube 190 is shown as having a cylindrical flange 191 and secured to the inner peripheries of the tube and flange are a number of soft metal rings 192 and 193 each formed of a multiplicity of separate segments set on the bias. The rings 192 and 193 slidingly engage an adjacent cylindrical portion being concentric with the drive shaft. Sealing member 189 is similarly associated with a cylindrical portion 195 of bearing 165. Dust proof pockets 196 and 197 are thus provided for the joints between the roll and the bearings. Ball bearing assemblies 198 and 199 are provided for taking axial thrust. The eccentric is at the bottom of its throw and Figure 22, in particular, shows how the upper portions of the pneumatic seating members are bulged laterally whereas the lower portions are radially expanded to maintain sealing contact with the rims.

Figures 26 to 32 illustrate the downwardly decreasing cross-sectional areas of the crushing space resulting from the downwardly increasing projection of the convexity 173 into the groove 169. The arrows in Figure 25 illustrate how the fed material starts down the fixed jaw first in the longitudinal direction which, as the convexity increases, changes more and more to the lateral, some of the material continuing all the way down to drop over the lower end of the face.

Figure 33:
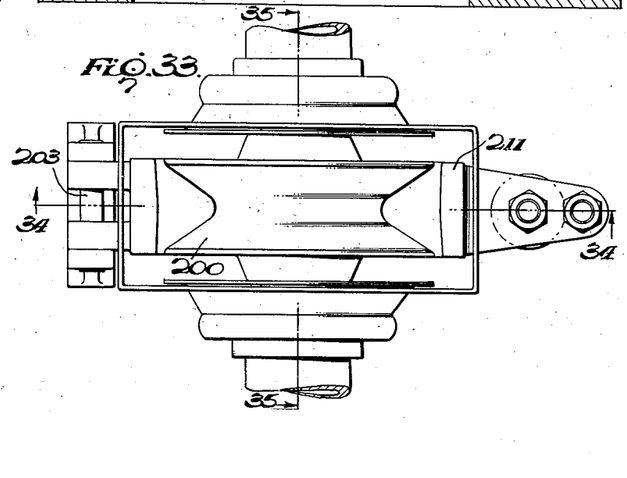
Figure 33 is a plan view of a further form of roll crusher in accordance with the invention.
Figure 34:
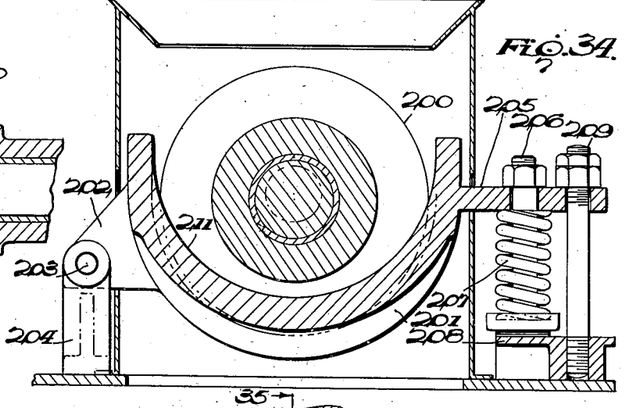
Figure 34 is a section on line 34—34 of Figure 33.
Figure 35:
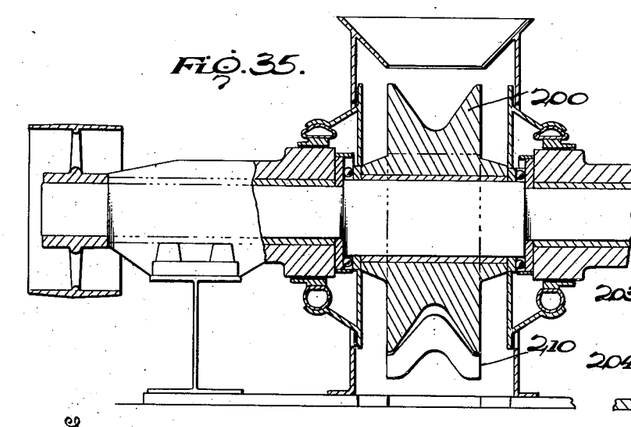
Figure 35 is a section on line 35—35 of Figure 33.

In Figures 33 to 35 the roll 200 is the same as roll 168 in Figures 18 to 22. Reference numeral 201 designates a U-shaped jaw provided at one side with ears 202 and pierced to receive a pivot pin 203 supported at the upper end of a pedestal 204 parallel to the roll axis. At its other side jaw 201 has a horizontally projecting arm 205 pierced to receive a vertical anchor bolt 206 which beneath the arm is surrounded by a compression spring 207 resting on a seat 208. Reference numeral 209 designates a hold-down bolt for the arm.

The jaw has a rim portion 210 and a convexity or rib 211 which commences at both sides of the roll somewhat above the horizontal and increases downwardly in height and sharpness from both sides to the vertical plane of the roll shaft axis, the convexity thus having a longitudinal section of crescent form. In this case, the entire discharge of the crushed material from the crushing spaces is lateral.

Figure 36:
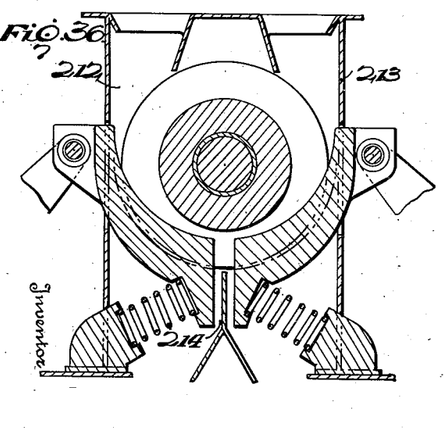
Figure 36 is a transverse vertical section, with parts removed, of a still further form of roll crusher in accordance with the invention.
Figure 37:
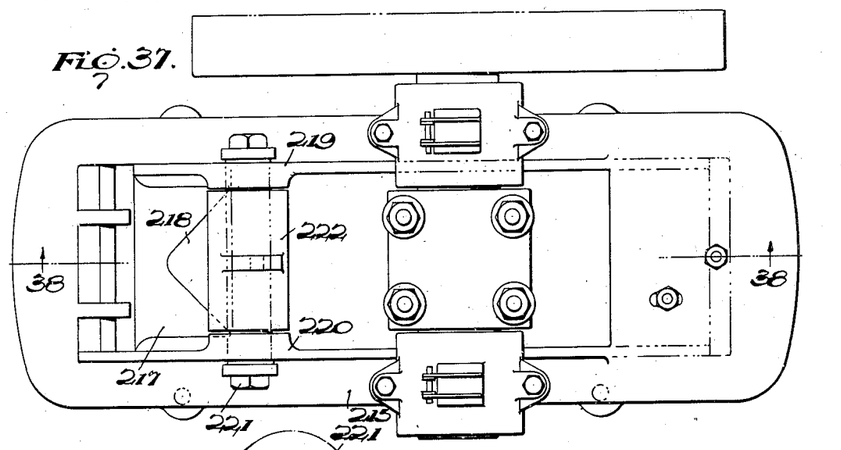
Figure 37 is a plan view of a swing jaw crusher in accordance with the invention.

In Figure 36 the roll and body arrangement is the same as in Figures 18 to 22. However, it is here contemplated that the jaws may have different adjustments relative to the roll so as to crush to different degrees of fineness. For example, the crushed material delivered at one side of the roll may be fed to the other side for further reduction. In order that the materials may be kept separate, I provide above the roll a hopper having separate feed passages 212 and 213 for the opposite sides of the roll and directly below the roll, I provide vertical baffle means 214 which keeps separate the output at the jaw ends.

Figure 38:
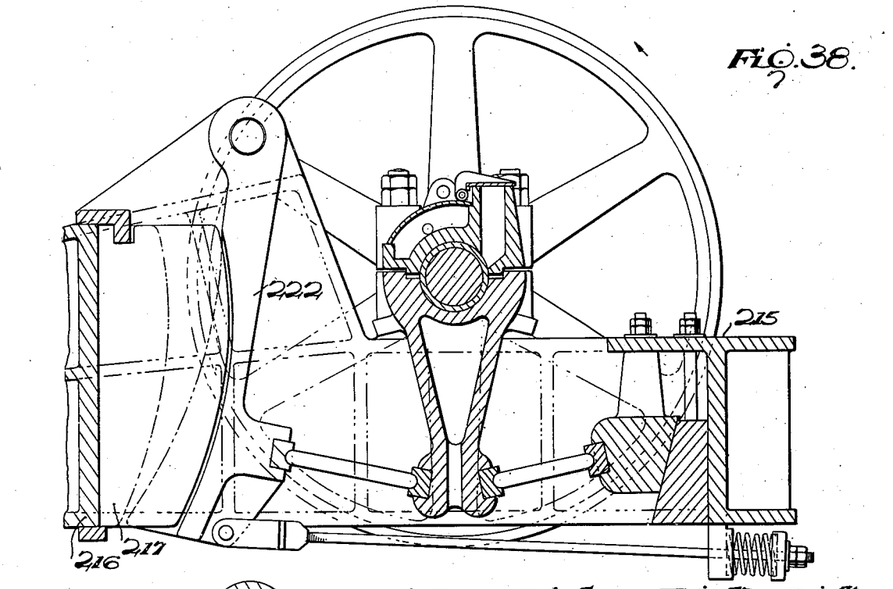
Figure 38 is a section on line 38—38 of Figure 37.
Figures 39, 40, 41, 42, 43, 44, 45, 46, 47:
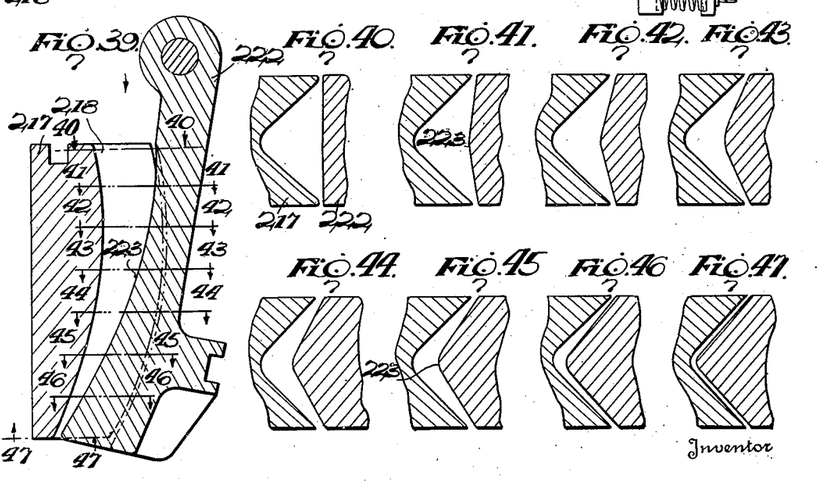
Figure 39 is a section on line 38—38 of the jaws only of the crusher of Figures 37 and 38.
Figures 40 to 47 are sections on the indicated lines of Figure 39.
Figures 48, 49:
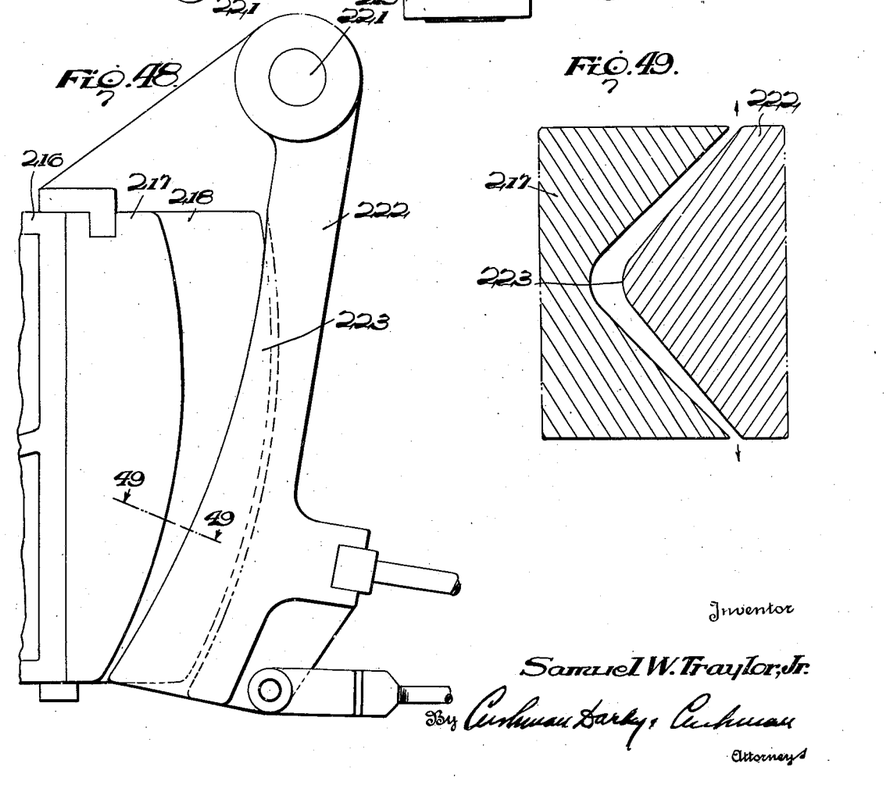
Figure 48 is a section like that of Figure 39, but on an enlarged scale.
Figure 49 is a section on line 49—49 of Figure 48 illustrating the transverse zone divisions of the crushing space.

Figures 37 to 49 illustrate a swing jaw crusher in accordance with the invention. Reference numeral 215 designates a frame having an upright portion 216 backing a fixed jaw 217 which will be considered to be the top jaw since it corresponds to the roll of the preceding embodiments. The jaw has a face which is longitudinally convex on an arc which is in a vertical plane and which curves from a point above the horizontal to a point below the horizontal, the face being provided with a longitudinal groove 218 of constant angularity. Upright portions 219 and 220 of frame 215 support a pin 221 on which is pivoted a swing jaw 222 which extends along the face of jaw 217 and constitutes a bottom jaw by analogy to the bottom jaws of the preceding embodiments. Jaw 222 has a transversely convex face starting adjacent the top of body 217, the convexity increasing downwardly in depth and angularity and being increasingly received downwardly in the groove 218 as clearly appears in Figures 40 to 48, the crest of the convexity or rib curving downwardly toward the horizontal more abruptly than the lower portion of the fixed jaw face. The jaw 222 is shown in open position, conventional toggle means of adjustable effect being shown in Figure 38 for oscillating the jaw.

It will be understood that the described embodiments are illustrative and that variations in the form and arrangement of parts beyond those shown are possible and are contemplated under the claims which follow.

I claim:

1. A crusher comprising a frame, a bottom jaw having unobstructed side edges supported by the frame and having an elongated face which is inclined lengthwise and has a transverse convexity which increases in depth from the upper to the lower end thereof and which is of substantially constant width, a top jaw having unobstructed side edges supported by the frame and having a crushing face similarly inclined and extending along and above the crushing face of the bottom jaw, the face of said top jaw being transversely concaved to provide a longitudinal groove into which the convexity of the bottom jaw projects in progressively increasing amounts from the upper to the lower end thereof, said faces of the upper and lower jaws providing a crushing space of constantly decreasing dimension in the longitudinal central section from the upper to the lower end and, at all transverse sections, tapering from a maximum dimension at the center, laterally to minimum dimensions at opposite unobstructed sides, whereby material may be reduced by successive movements longitudinally through the space from the upper to the lower end thereof and by successive movements transversely through the space from the center to the sides and discharged by endwise and sidewise movement, and means for relatively moving the jaws toward and away from each other.

2. A crusher comprising a frame, a bottom jaw having unobstructed side edges supported by the frame and having an elongated face which is disposed on a longitudinally concave upwardly facing curve and has a transverse convexity which increases in depth from the upper to the lower end thereof and which is of substantially constant width, a top jaw having unobstructed side edges supported by the frame and having a crushing face longitudinally convexly curved and extending along and above the crushing face of the bottom jaw, the face of said top jaw being transversely concaved to provide a longitudinal groove into which the convexity of the bottom jaw projects in progressively increasing amounts from the upper to the lower end thereof, said faces of the upper and lower jaws providing a crushing space of constantly decreasing dimension in the longitudinal central section from the upper to the lower end and, at all transverse sections, tapering from a maximum dimension at the center, laterally to minimum dimensions at opposite unobstructed sides, whereby material may be reduced by successive movements longitudinally through the space from the upper to the lower end thereof and by successive movements transversely through the space from the center to the sides and discharged by endwise and sidewise movement, and means for relatively moving the jaws toward and away from each other.

3. A crusher comprising a frame, a bottom jaw supported by the frame and having an elongated face which is inclined lengthwise, has an upper portion which is substantially flat transversely thereof and a transverse convexity extending downwardly therefrom, which increases substantially constantly in depth toward the lower end, a top jaw supported by the frame and having a crushing face extending along the crushing face of the first jaw in cooperative relation therewith, the face of said top jaw being transversely concaved so that a longitudinal groove is provided which receives the convex face of the bottom jaw in substantially constantly increasing amounts toward the lower end of the latter to define therewith a crushing space of downwardly decreasing cross-sectional area, open at its sides and lower end for the escape of crushed material, one of said jaws being pivotal about an axis extending transversely thereof, and means including a rotary drive shaft supported by said frame parallel to said axis for moving said one of said jaws toward and away from the other, said faces being so shaped lengthwise relative to each other and the relative movement of the jaws being such that said space is divided into a succession of superposed crushing zones of which each zone has an upper cross-sectional area between the jaw faces which in the closed position of the jaws is substantially equal to its lower cross-sectional area in the open position of the jaws, each zone having a volumetric capacity sufficient to receive all of the material reaching it from the next higher zone.

4. A crusher according to claim 3 wherein the top jaw is in the form of a roll and wherein said moving means comprises an eccentric portion on said shaft on which said roll is pivotal, the face of the bottom jaw being curved lengthwise.

5. A crusher according to claim 3 wherein said axis is fixed and is adjacent the upper end of said one of said jaws, and wherein said moving means comprises an oscillating connection between said drive shaft and the lower portion of said one of said jaws.

6. A crusher comprising a frame, a bottom jaw supported by the frame and having an elongated face which is inclined lengthwise and has a transverse convexity which increases substantially constantly from a substantially flat upper portion downwardly in depth to a relatively steep sided portion at its lower end, a top jaw supported by the frame and having a crushing face extending along the crushing face of the bottom jaw in cooperative relation therewith, the face of said top jaw being transversely concaved so that a longitudinal groove is provided which receives the convex face of the bottom jaw to define therewith a crushing space which tapers and decreases in cross-sectional area from its upper to its lower end said space being open at its sides and lower end for the lateral and endwise escape of crushed material, one of said jaws being pivotal about an axis extending transversely thereof, and means for moving said one of said jaws toward and away from the other.

7. A crusher according to claim 6 wherein the concavity of said groove is uniform throughout and the convexity of the bottom jaw face at its lower extremity approaches the transverse contour of said groove.

8. A crusher according to claim 6 wherein the convexity of the bottom jaw face is substantially constant in vertical sections parallel to said axis.

9. A crusher according to claim 6 wherein the concavity of said groove is uniform throughout and the convexity of the bottom jaw face at its lower extremity approaches the transverse contour of said groove, and wherein the convexity of the bottom jaw face is substantially constant in vertical sections parallel to said axis.

10. A crusher comprising a frame, a horizontal rotary drive shaft supported by the frame and having an intermediate eccentric portion, a jaw in the form of a roll rotatably mounted on said eccentric portion, said jaw having a face provided with a transversely concave peripheral groove, a fixed jaw supported by the frame and having a curved face extending downwardly along and under a lower portion of the first jaw face, said curved face having a transverse convexity which increases downwardly in depth and increasingly projects into said groove, said faces defining a crushing space which tapers from its upper to its lower end and is open at its sides and lower end for the escape of crushed material.

11. A crusher according to claim 10 wherein the concavity of said groove is uniform throughout and the convexity of the fixed jaw face at its lower extremity approaches the transverse contour of said groove.

12. A crusher according to claim 10 wherein the convexity of the fixed jaw face is substantially constant in vertical sections parallel to said axis.

13. A crusher according to claim 10 wherein the concavity of said groove is uniform throughout and the convexity of the fixed jaw face at its lower extremity approaches the transverse contour of said groove and wherein the convexity of the fixed jaw face is substantially constant in vertical sections parallel to said axis.

14. A crusher comprising a frame, a horizontal rotary drive shaft supported by said frame and having an intermediate eccentric portion, a roll rotatably mounted on said eccentric portion and having a plurality of peripheral grooves constituting jaw faces of concave section and a fixed jaw supported by the frame and having a plurality of curved faces in spaced apart side by side relation, each of said curved faces having a transverse convexity which increases downwardly in depth and extends into one of said grooves to define therewith a crushing space which tapers from its upper to its lower end and is open at its sides and lower end for the escape of crushed material.

15. A crusher according to claim 14 wherein the concavity of each of said grooves is uniform throughout and the convexity of each fixed jaw face at the lower extremity thereof approaches the transverse contour of its associated groove.

16. A crusher according to claim 14 wherein the convexity of each fixed jaw face is substantially constant in vertical planes parallel to the shaft axis.

17. A crusher according to claim 14 wherein the concavity of each of said grooves is uniform throughout and the convexity of each fixed jaw face at the lower extremity thereof approaches the transverse contour of its associated groove, and wherein the convexity of each fixed jaw face is substantially constant in vertical planes parallel to the shaft axis.

18. A crusher comprising a jaw having a face which is lengthwise convex on a vertical arc and which is transversely concaved to provide a groove, said face being disposed so as to incline downwardly toward the horizontal, a second jaw having a face which is lengthwise concave and extends downwardly along and under the first face, said second face having a transverse convexity which increases downwardly in depth and extends into said groove, said convexity having a lengthwise crest curved on an arc whose center is above the center of the first arc, said faces defining a downwardly tapering crushing space which is open at its sides and lower end for the escape of crushed material, and means for closing and opening the jaws.

19. A crusher according to claim 18 wherein the second jaw face extends downwardly substantially from the vertical to the horizontal.

20. A crusher according to claim 18 wherein the convexity of the second jaw face is substantially constant in transverse vertical sections.

21. A crusher according to claim 18 wherein the second jaw face extends downwardly substantially from the vertical to the horizontal and wherein the convexity of said second jaw face is substantially constant in transverse vertical sections.

22. A crusher comprising a bottom jaw having a face which curves lengthwise downwardly from substantially the vertical at its upper end toward the horizontal and which has an upper portion which is transversely substantially flat and a transverse convexity merging therewith which increases downwardly in depth while remaining at constant width, and a top jaw having a curved face provided with a groove which increasingly receives said convexity downwardly so that the faces define a downwardly tapering crushing space which diminishes downwardly in cross-sectional area and is open and unobstructed at its sides and lower end for the lateral and endwise escape of crushed material, the downwardly steepening transverse angle of the convexity acting to provide lateral discharge and to compensate for the loss of lengthwise steepness as the bottom jaw face curves toward the horizontal, and means for closing and opening the jaws.

23. A crusher according to claim 22 wherein the top jaw face and the base of the convexity are on arcs having closely adjacent centers, and wherein the crest of the convexity is on an arc whose center is above the centers of the first arcs.

24. A crusher comprising a bottom jaw having a face which curves lengthwise downwardly toward the horizontal and which has a transverse convexity defined by transversely inclined sides of downwardly increasing steepness and which convexity increases downwardly in depth while remaining at constant width, and a top jaw having a curved face provided with a groove which increasingly receives said convexity downwardly, with the sides thereof increasingly approaching the sides of the groove, so that the faces define a downwardly tapering crushing space which diminishes downwardly in cross-sectional area and is open at its sides and lower end for the lateral and endwise escape of crushed material, the downwardly increasing steepness of the sides of the convexity acting to compensate for the loss of lengthwise steepness as the bottom jaw face curves toward the horizontal, and means for closing and opening the jaws, the relation of said faces and their relative movement being such that said space is divided into a succession of superposed crushing zones of which each zone has an upper dimension between said faces which in the closed position of the jaws is substantially equal to its lower dimension in the open position of the jaws, each zone having a volumetric capacity sufficient to receive all of the material reaching it from the next higher zone.

25. A crusher comprising top and bottom jaws having faces which curve downwardly toward the horizontal, the face of the bottom jaw having a transverse convexity which increases substantially constantly in depth and steepness from its upper end to its lower end and the face of the top jaw having a groove which constantly and increasingly receives said convexity downwardly, the space between the jaws being open at its sides and at its lower end for the escape of crushed material, and means for closing and opening the jaws.

26. A crusher as in claim 25, characterized in that the relation of said faces and their relative movement are such that said space is divided into a succession of superposed crushing zones of which each zone has an upper dimension between said faces which in the closed position of the jaws is substantially equal to its lower dimension in the open position of the jaws, each zone having a volumetric capacity sufficient to contain all of the material reaching it from the next higher zone.

27. A crusher comprising a frame, a rotary horizontal shaft supported by said frame, said shaft having an eccentric portion, a crushing roll rotatable on said eccentric portion, jaws supported by the frame and cooperating with the under sides of the roll at opposite sides of the vertical plane of the shaft axis, said roll having a peripheral groove and each of said jaws having a transverse convexity which increases downwardly in depth and increasingly projects into said groove, a partition below the roll in said plane, and separate feed openings above the roll on opposite sides of said plane.

28. A crusher comprising a horizontal rotary shaft having an eccentric portion, a roll rotatably mounted on said eccentric portion and having a face provided with an outwardly flared peripheral groove, a fixed jaw curving downwardly along and under said roll, said fixed jaw having a face in the form of a longitudinally extending rib of tapering section toward said roll, the tapering section of said rib increasing downwardly in height and sharpness, having a crest on an arc eccentric with respect to the roll and increasingly extending into said groove to define therewith a crushing space which decreases downwardly in cross-sectional area and is open at its sides for the lateral escape of crushed material.

SAMUEL W. TRAYLOR, Jr.

REFERENCES CITED

The following references are of record in the file of this patent:

UNITED STATES PATENTS

| Number | Name | Date |
| --- | --- | --- |
| 297,756 | Case | Apr. 29, 1884 |
| 450,890 | Morris | Apr. 21, 1891 |
| 1,924,536 | Blum | Aug. 29, 1933 |
| 1,946,763 | Sallwasser | Feb. 13, 1934 |
| 2,097,906 | Wettlaufer | Nov. 2, 1937 |
| 2,122,033 | Hallenbeck | June 28, 1938 |
| 2,131,801 | Gruender | Oct. 4, 1938 |

FOREIGN PATENTS

| Number | Country | Date |
| --- | --- | --- |
| 429,473 | Great Britain | May 30, 1934 |
| 650,660 | Germany | Sept. 27, 1937 |